United States Patent

[11] 3,540,417

[72] Inventor Mark Reed
P.O. Box 1872, 1035 19th Place, Vero Beach, Florida 32960
[21] Appl. No. 776,532
[22] Filed Nov. 18, 1968
[45] Patented Nov. 17, 1970

[54] CHINCHILLA COLLAR
1 Claim, 3 Drawing Figs.

[52] U.S. Cl. .................................................. 119/106, 119/15
[51] Int. Cl. .................................................. A01k 27/00
[50] Field of Search ....................................... 119/1, 15, 106

[56] References Cited
UNITED STATES PATENTS

| | | | |
|---|---|---|---|
| 3,062,183 | 11/1962 | Tate .............................. | 119/15 |
| 3,072,098 | 1/1963 | Boemle ......................... | 119/106 |
| 3,387,588 | 6/1968 | Bird .............................. | 119/106 |

*Primary Examiner*—Aldrich F. Medbery

ABSTRACT: A yoke around the neck of a female chinchilla so to prevent her from having access to move outward from an entrance of her cage, the device comprising a plurality of flat links which are enjoined at their ends so to form a collar around her neck.

Patented Nov. 17, 1970 3,540,417
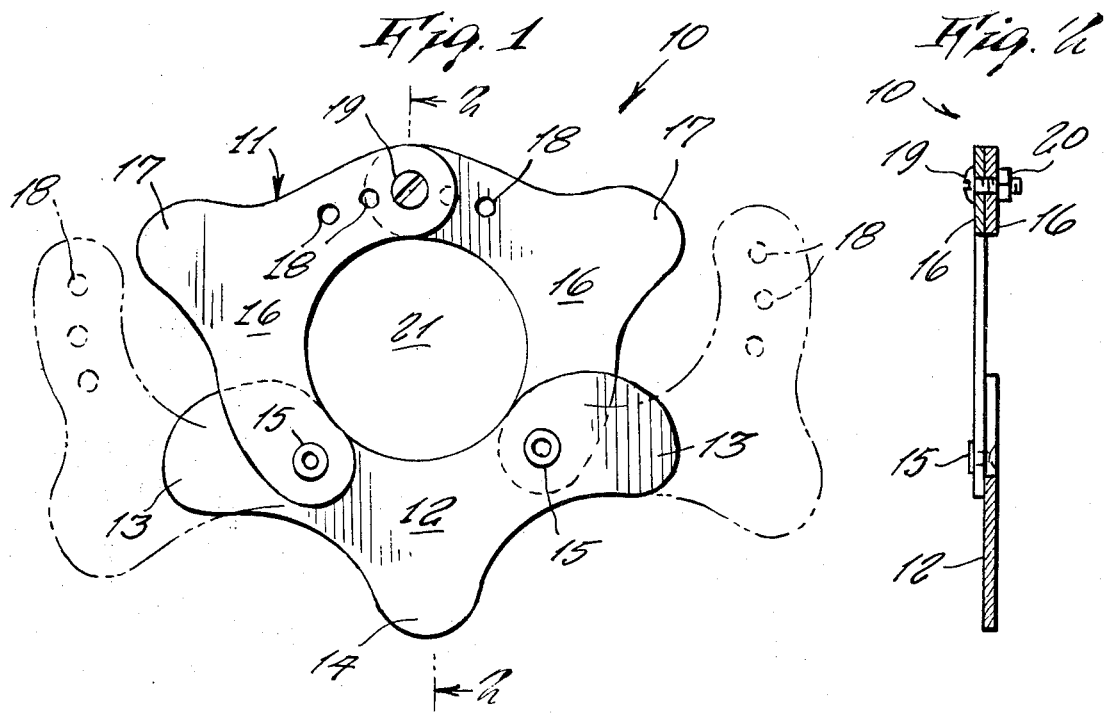
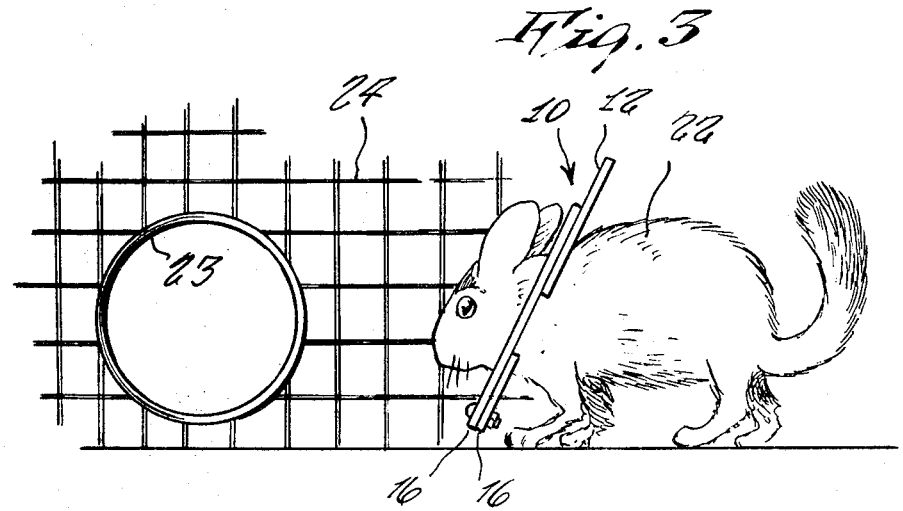
INVENTOR
MARK REED

CHINCHILLA COLLAR

This invention relates generally to animal yokes. More specifically, it relates to breeding equipment.

It is generally well known to those skilled in the art of breeding chinchillas that the cages are arranged in rows having a passageway made on the back of the row of cages, the passageway providing a means for allowing a male chinchilla to move from cage to cage. Each cage has an opening through which the male chinchilla may enter the cage, however, it is not wanted that the female chinchilla leave the cage.

Accordingly, it is the principal object of the present invention to provide a chinchilla collar for being worn by a female chinchilla so to prevent her being able to squeeze through the cage entrance, thus forcing her to remain within the cage for breeding purposes.

Another object of the present invention is to provide a chinchilla collar which will keep the female chinchillas separated.

Another object of the present invention is to provide a chinchilla collar which, while preventing movement out of the cage by a female chinchilla, will not in any way hamper access thereinto by a male chinchilla.

Yet a further object of the present invention is to provide a chinchilla collar which is worn upon the neck of the animal and which is readily adjustable in size so as to accommodate animals of different sizes.

Other object of the present invention are to provide a chinchilla collar which is simple in design, inexpensive to manufacture, rugged in construction, easy to use and efficient in operation.

These and other objects will become readily apparent upon a study of the following specification together with the accompanying drawing wherein:

FIG. 1 is a front elevation view of the present invention,

FIG. 2 is a cross-sectional view taken along the lines 2-2 of FIG. 1; and

FIG. 3 is a side view thereof shown being worn by a chinchilla within a cage.

Referring now to the drawing in detail, the reference numeral 10 represents a chinchilla collar, according to the present invention, wherein there is a collar assembly 11 comprised of a plurality of links which are enjoined. The links include a yoke member 12 which in an operative use generally seats itself over the upper end of the neck of the animal, the yoke having sidewardly extending ears 13 and an intermediate extending ear 14. A pair of spaced-apart rivets 15 mounted on the yoke are each enjoined to a pivotable, generally L-shaped link 16, each of which has an intermediate extending ear 17. The opposite end of each of the L-shaped links is provided with a plurality of three openings 18. The links 16 are pivotable so that a selected one of the openings 18 on one of the links 16 may be selectively positioned in alignment with the opening 18 of the other link 16, so as to allow a screw 19 to be inserted therethrough, the screw receiving a nut 20. When the links 16 are thus enjoined together, it will be evident that a central opening 21 is formed by the collar components, the opening 21 being provided for receiving the neck of a chinchilla 22. It will now be evident that the plurality of openings 18 in the two links 16 will allow a full adjustment for different neck sizes of the animals.

In operative use, the collar is positioned adjacent the neck of the female chinchilla with the L-shaped links 16 being in an outwardly pivoted position, as is indicated by the phantom lines in FIG. 1. The L-shaped links 16 are then pivoted around the neck of the animal until a selected one of the openings 18 in each of the links 16 are brought in alignment and a screw is there inserted therethrough, the screw receiving the nut. Thus the animal wears the collar 10, which when viewed from a front direction, will readily indicate that the plurality of sidewardly projecting ears 13, 14 and 17, project too far for the animal to pass through the entrance 23 of the cage 24.

It will be readily understood that the chinchilla collar will in no way interfere with the other living habits of the animal and will allow a sufficient head movement so as to allow the animal to eat. The collar in no way will be uncomfortable.

The present chinchilla collar may be made from a plastic or other material, as preferred.

It is generally known that other conventional collars are round in shape and that the male chinchilla will chew them up and thus decreasing them in size so as to allow the female chinchilla to leave her cage and enter other cages. With the present collar having the sidewardly extending ears, these ears comprise five projections which thus give the male chinchilla more to chew upon and thus make the collar last a much longer time.

While various changes may be made in the detailed construction, it is understood that such changes will be within the spirit and scope of the present invention as is defined by the appended claims.

I claim:

1. In a chinchilla collar, the combination of a collar assembly mountable around the neck of a female chinchilla, the collar assembly being comprised of a plurality of links, each of said links having self-contained means so to prevent said female chinchilla to have access through an entrance outwardly of her cage, said links including a yoke member, said yoke member having a pair of extending ears at each end thereof and an intermediate extending ear, a rivet near each end of said yoke member, each said rivet being enjoined to one end of a pivotable L-shaped link, the opposite end of said L-shaped links having means for pivotal securement together adjustably providing a multipivoted uniformly expanding and contracting neck-encircling means to individually fit each female chinchilla, and each said L-shaped link having an intermediate outwardly projecting ear, said means for securement together of said L-shaped links comprising a plurality of openings in each of said L-shaped links for a selective alignment of said openings in each said L-shaped link so as to receive a screw therethrough, said screw receiving a nut.